United States Patent Office 3,671,168
Patented June 20, 1972

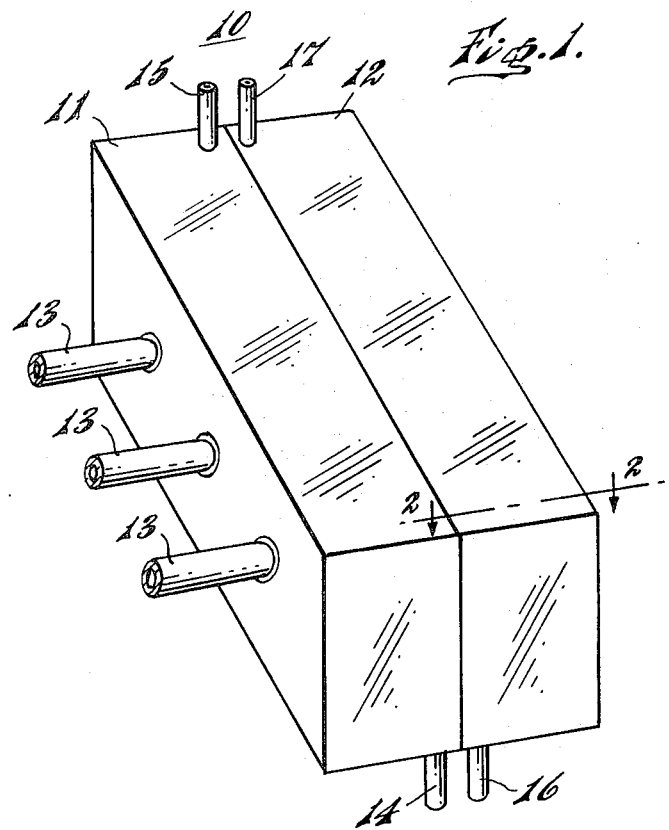
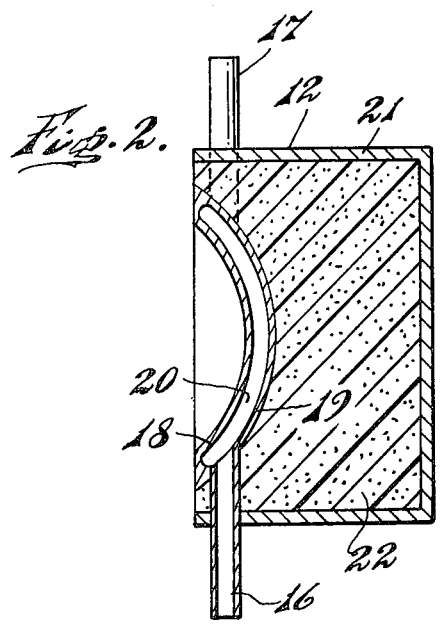

3,671,168
LOW HEAT CAPACITY MOLD FOR INJECTION MOLDING
Frank J. Nussbaum, New York, N.Y., assignor to Bischoff Chemical Corporation, Hicksville, N.Y.
Continuation of abandoned application Ser. No. 752,518, Aug. 14, 1968. This application June 9, 1971, Ser. No. 149,901
Int. Cl. B29c 1/00
U.S. Cl. 425—242      1 Claim

ABSTRACT OF THE DISCLOSURE

Thin walled molds having a thickness within a range from about 0.4 mm. to about 4 mm. and having a heat capacity less than the heat capacity of the molded article are provided in apparatus for injection molding of plastic foam. In certain embodiments, heat transfer fluid is circulated in a zone adjacent the thin walled mold face. In some embodiments of the invention, an outer shell can provide supplemental structural strength, while being insulated by closed pore insulation from the temperature changes and heat capacity features of the mold face.

CROSS REFERENCE TO PARENT APPLICATION

This is a streamlined continuation of parent application Ser. No. 752,518 filed Aug. 14, 1968, now abandoned. Some of the applications which also identify Ser. No. 752,518 as a parent application include: 884,896, filed Dec. 15, 1969; 884,956, filed Dec. 15, 1969; 10,920, filed Feb. 12, 1970; 17,252, filed Mar. 6, 1970; 28,089, filed Apr. 13, 1970; and divisional 63,944, filed Aug. 14, 1970. Each such application is deemed here reiterated.

BACKGROUND

In injection molding, a controlled amount of thermalplastic material is forced into a mold during a brief mold-filling operation, and the thermalplastic material cools and solidifies sufficiently to permit removal of the article from the mold prior to reuse of the mold. In order to shorten the mold-filling operation, relatively high injection pressures have sometimes been employed, and heavy expensive molds have been customary for making articles free from pores. An Angell-type of method of preparing structural plastic foam, as described in Angell 3,268,636, has been employed industrially in making structural plastic aritcles. The description of an Angell-type of method, as set forth in Voelker application Ser. No. 716,009, filed Mar. 26, 1968, now U.S. Pat. 3,512,216, is deemed reiterated. Such method involves the injection of plastic foam into the mold from a plurality of injection nozzles, each nozzle having a purging pin functioning as a shut-off valve, the purging pin normally being in a closed position, and opening to permit the flow of the pressurized plastic foam only during the brief mold-filling portion of the operating cycle. Gas at many atmospheres pressure provides the force for a quasi-explosive bursting (i.e. a rapid flow) of the plastic foam into the mold. During the cooling of the plastic foam article in the mold, the pressure is substantially atmospheric, thus making it feasible to employ lighter weight molds for plastic foam than has been true of the injection molded articles which are solidified under pressure. By reason of the necessity for the mold to withstand the explosive pressures of mold-filling, the molds have been relatively thick and of high heat capacity. The heat derived from the successive mold-filling steps has been dissipated by phenomena such as radiation of heat from the molds during the cooling of the article within the mold. For such heat dissipation function, it has been advantageous to utilize molds having a heat capacity significantly greater than the heat capacity of the article being molded.

SUMMARY

In accordance with the present invention, plastic foam articles are manufactured by a method featureing a mold having a heat capacity less than the heat capacity of the article being produced. Relatively thin (i.e. about 0.4 to about 4 mm.) walls of the mold permit the heat of the hot plastic foam to be transmitted to the opposite wall very quickly. If desired, such heat can be dissipated into the air, so that air currents can provide the cooling for the molded article.

In certain embodiments of the invention, chambers are provided for the circulation of a heat transfer fluid (e.g. ethylene glycol, triethoxy glycerol, tetrachloroethylene, or other standard heat transfer liquid) for more rapidly cooling the article within the mold. If heat transfer chambers are employed, then the mold may advantageously include a shell and closed pore insulation between the shell and the heat transfer chamber. In the method of making structural plastic articles by the use of such molds, gaseous or liquid heat transfer fluid can be directed through the heat transfer chambers to cool the article more quickly than would otherwise be feasible, thus increasing the productive capacity of the apparatus. A step of heating the mold face just prior to the mold-filling step can be included in certain embodiments of the improved method. The alternation between heating and cooling is sometimes achieved by alternate use of two immiscible liquids which more readily displace each other by plug flow through the heat transfer chamber.

DESCRIPTION OF DRAWINGS

FIG. 1 is a perspective view of a split mold designed for the manufacture of structural plastic articles comprising plastic foam. FIG. 2 is a sectional view taken on the line 2—2 of FIG. 1.

GENERAL DESCRIPTION

A mold 10 comprises a fixed portion 11, and a reciprocating portion 12, adapted to be split away from the fixed portion whenever the molded article is to be removed. A plurality of injection nozzles 13 are adapted to force plastic foam into the mold during the mold-filling step of the process. In order to direct heat transfer fluid through the mold 10, inlets 14, 16 and outlets 15, 17 are provided in the portions 11, 12, respectively. As shown in FIG. 2, a mold face 18 is sufficiently thin that the heat from the hot plastic foam article is readily transmitted therethrough. A supplemental wall 19 is spaced from the mold face 18, and defines therebetween a heat transfer chamber 20. The mold 10 includes a shell 21 which is insulated from the mold face 18 by insulation 22 having a closed pore structure, such as foam glass or rigid polyurethane insulation.

The heat capacity of the mold face 18 is less than the heat capacity of the article to be molded. Whether the mold face is employed alone or in combination with a heat transfer chamber 20, such low heat capacity mold is surprisingly advantageous in the manufacture of structural plastic articles comprising significant pore volume.

The article cools faster, permitting quicker removal of the plastic foam article from the mold, and increasing the production capacity of the apparatus.

The method of injection molding structural plastic articles by the use of a mold comprising the thin, low heat capacity face and a heat transfer chamber is outstandingly superior to previous methods. Air can be used as the heat transfer fluid flowing through the heat transfer chamber 20. Very cold nitrogen derived from liquid nitrogen is advantageous when short runs requiring cooling are contemplated. Water cooling operation may be of the once through or recirculation with intermediate refrigeration type. In order to hasten adequate solidification of the article, the mold face is desirably chilled below the temperature at which it first encounters the hot plastic foam for the next injection. Excessive chilling necessitates higher injection pressures and may produce thick non-cellular skins on the plastic article. Brief heating of the mold face overcomes such problems. In order to alternate from cooling to heating, a pair of immiscible liquids are directed successively in plug flow through the heat transfer chamber and thence to a separation zone for correct recirculation. Water may thus be employed as a recirculating cooling liquid, and a solution of hexachloroethane in tetrachloroethylene can be employed as a heating liquid.

In any of the methods of operation of the invention, the plastic foam is forced into an accumulator until a controlled volume is available, and then the piston in the accumulator actuates the signal initiating the mold-filling step. The purge pins of the injection nozzles are retracted from their normally closed position, and the plastic foam is permitted to flow into the mold until the piston in the accumulator retracts to a controlled position, thereby initiating the signal for returning the purging pins to their normal positions and terminating the mold-filling step.

The invention claimed is:

1. In an injection molding apparatus for injection molding of large articles of cellular plastic having a plurality of generally parallel injection nozzles, the improvement which comprises:

a split mold having a plurality of openings adapted to accept from said plurality of injection nozzles the simultaneous flow of a controlled volume of a dispersion of pressurized gas in hot, flowable thermoplastic, said thermoplastic material cooling in the mold to produce a structural plastic cellular large article;

said split mold having mold faces having a thickness within the range from about 0.4 to 4 mm.;

said split mold having heat transfer chambers adjacent to the rear face of the mold, whereby heat transfer fluid may be circulated through the heat transfer chambers to cool said large article in the mold more rapidly than would be attainable without circulation of such heat transfer fluid;

said split mold having a thermal capacity significantly less than the thermal capacity of said cellular plastic large article made therein;

said split mold having a shell imparting mechanical strength to the mold;

and closed pore insulation positioned between the shell and heat transfer chambers, whereby atmospheric heat is only slightly transferred to the heat transfer fluid in the heat transfer chambers.

References Cited

UNITED STATES PATENTS

| | | | |
|---|---|---|---|
| 3,124,627 | 3/1964 | Hood | 249—79 X |
| 3,158,898 | 12/1964 | Northrup et al. | 18—5 P |
| 3,204,293 | 9/1965 | Brownson et al. | 18—5 BJ X |
| 3,331,899 | 7/1967 | Immel | 18—5 P X |
| 3,374,500 | 3/1968 | Drenning | 18—5 P |
| 3,387,324 | 6/1968 | Valyi | 18—5 BJ |

FOREIGN PATENTS

| | | | |
|---|---|---|---|
| 1,234,310 | 10/1960 | France | 18—30 WJ |
| 1,091,885 | 11/1967 | Great Britain | 18—30 WJ |

J. SPENCER OVERHOLSER, Primary Examiner

M. O. SUTTON, Assistant Examiner

U.S. Cl. X.R.

249—79; 425—245, 817